Figures 1, 2, 3:
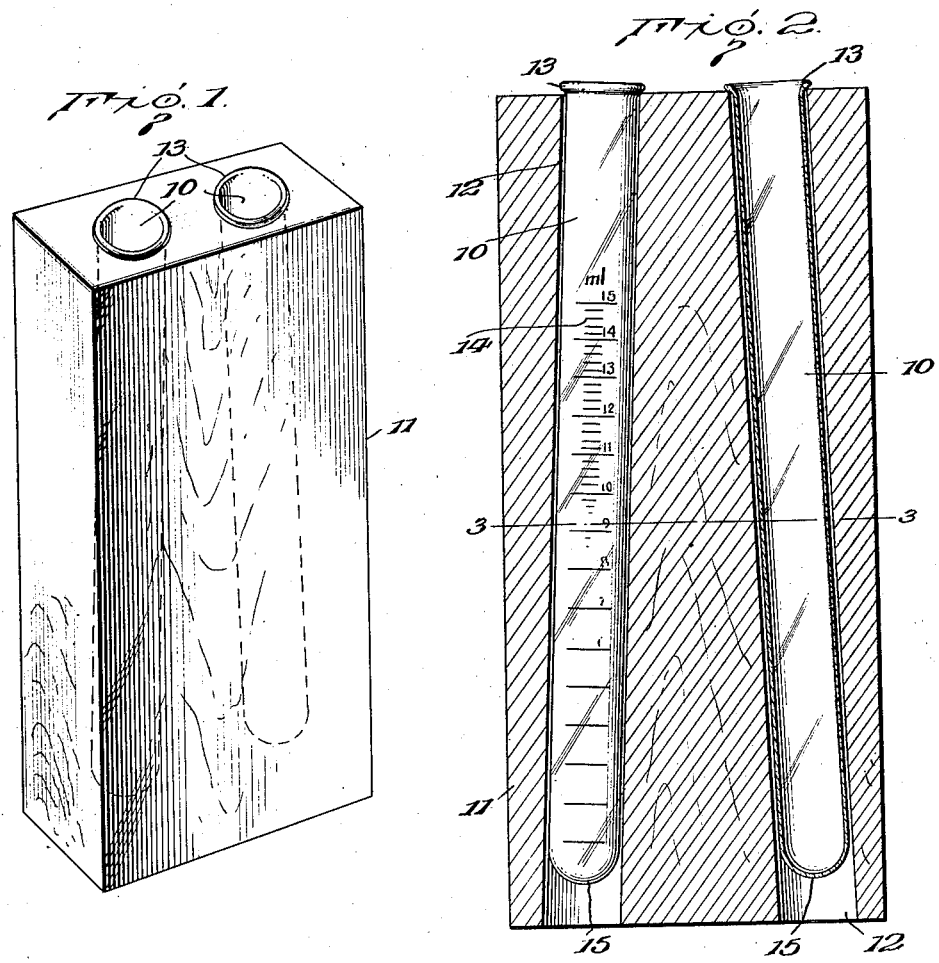

May 24, 1932.  A. T. BRICE, JR  1,859,278
COLORIMETER
Filed May 28, 1930

Inventor
Arthur T. Brice, Jr.,
By [signature]
His Attorneys

Patented May 24, 1932

1,859,278

UNITED STATES PATENT OFFICE

ARTHUR T. BRICE, JR., OF WASHINGTON, DISTRICT OF COLUMBIA

COLORIMETER

Application filed May 28, 1930. Serial No. 456,544.

My invention relates to an improved colorimeter and, more particularly, to a colorimeter suitable for use in the accurate color comparison of substances for the purpose of analysis.

The primary object of my invention is to provide an inexpensive colorimeter by which such fine and delicate color comparison and matching as is required in blood analysis and spinal fluid analysis may be accomplished.

A further object of my invention is to provide an accurate colorimeter which is not particularly subject to injury through careless use, and which may be readily repaired, if injured, without the use of expensive optical repair facilities.

A further object of my invention is to provide an inexpensive colorimeter in which the known substance, and the substance the value of which is to be determined, are in the same field of view and may be simultaneously observed and compared.

A still further object of my invention is to provide an accurate colorimeter requiring no special and expensive source of light.

Further objects, and objects relating to details and economies of manufacture, will definitely appear from the detailed description to follow. In one instance, I accomplish the objects of my invention by the means described in the following specification. My invention is clearly pointed out in the appended claims. A preferred embodiment of my invention is illustrated in the accompanying drawings, forming a part of this specification, in which:

Figure 1 is a perspective view of a colorimeter constituting a preferred embodiment of my invention, Fig. 2 is a vertical sectional view of the colorimeter shown in Fig. 1, and Fig. 3 is a horizontal sectional view of the same colorimeter.

In the drawings, the same reference numerals refer to the same parts throughout the several views.

In the analysis of blood and spinal fluid for sugar, solutions thereof are made and compared with standard solutions. In such comparison an accurate colorimeter is necessary, and, up to the present time, colorimeters suitable for such use have been of complex optical construction. In view of the infrequent use of such an instrument, and its cost, many general practitioners entering practice have postponed its purchase.

Further, such instruments, if accidentally damaged, generally require special optical repair facilities which are limited in number and are therefore frequently remote. For these reasons, an inexpensive colorimeter of sufficient accuracy to be capable of filling not only the need of the general practitioner of moderate means, but of serving as a satisfactory substitute for an expensive instrument undergoing shipment and repair should have a ready market.

Briefly, my invention consists in providing a matched pair of test tubes, that is, a pair of exactly equal capacity, length, and diameter. These two tubes are supported in a member which excludes light from the entire side walls of the tubes and permits an equal amount of light to pass upwardly through the bottom of each test tube whereby the contained substances are subjected to equal transillumination. The tubes are maintained in such spaced and aligned relation by the block as to lie in the same field of view whereby both tubes may be sighted and compared with one or both eyes open and with little or no movement of the instrument or the operator's head.

Referring to the numbered parts of the drawings wherein I have disclosed a preferred embodiment of my invention, I employ a matched pair of test tubes 10 of exactly equal capacity, length, and diameter. Such matched sets may be easily obtained from reliable supply houses. For the purpose of supporting the test tubes, excluding undesirable light, and directing equal amounts of light upon the bottoms only of the test tubes 10, I provide a block 11 of greater height than the tubes with a pair of bores 12 in which the tubes 10 are snugly fitted. The tubes 10 are preferably provided with lips 13 which rest upon the top surface of the block and maintain the bottoms 14 of the test tubes equally spaced from the lower ends of the bores 12, whereby the light striking the tube bottoms is in the from of two equal pencils. The bores 12 are preferably lined with a non-reflecting coating (not shown) such as flat black paint to prevent any stray reflection of light into the tubes. The bores have one plane common to their axes but diverge downwardly in that plane as shown in Fig. 2. By reason of this alignment and divergence, both tubes may be simultaneously sighted through with one or both eyes open and a minimum amount of movement either of the block or of the operator's head is required. If the alignment is correct so that an absolute minimum of motion is required, the faculties may be concentrated on the color comparison, and very accurate matching may be done.

In view of the fact that the eyes of most persons are spaced at a more or less standard interpupillary distance, that is, within the limits of 66 and 62 mm., it has been found possible to proportion the the instrument to a standard size adaptable for use by the majority of operators. I have found that for use with test tubes of 15 ml. capacity having an outside diameter of 13 mm., a block 32 x 76 x 165 mm. is convenient. A distance of 33 mm. between the tube bores from center to center at the top of the block, with an angle of divergence of 5 degrees provides a highly satisfactory instrument of standard size adapted to be held at normal reading distance fom the operator's eyes, that is approximately 13 inches. However, such changes in size and general dimensions as are necessary to the provision of an instrument adapted for use by operators having abnormal interpupillary distances are apparent and suggest themselves. Similarly, should it be deemed desirable to so construct the test tube holder as to permit adjustment of the tubes to various angles of divergence, or to several positions of spacing, numerous expedients are available, and their adoption for this purpose is contemplated. In order to permit the tubes to be readily removed from the block, the bores are best of a diameter approximately 3 mm. greater than that of the tubes. The block may be made of any suitable material such as wood, bakelite, etc., and maple has been found well adapted for this use. For the sake of accuracy, the bores are preferably drilled in a lathe, each bore at an angle of 2½ degrees with the central vertical axis of the block.

For facilitating content determination, indicating graduations 14 are preferably formed on each test tube, a graduation interval of ⅕ ml. being sufficiently fine. While the tubes are shown provided with hemispherical bottoms 15, tubes with flat bottoms or bottoms of other forms may be employed.

In using test tubes having hemispherical bottoms, a dark ring surrounding each color spot will be observed. These do not detrimentally affect the accuracy attainable with the instrument, but are rather of advantage since they have the effect of "framing" the color images.

To use the instrument, a light reflecting surface such as a white sheet of paper, plate or the like is placed upon a table or other horizontal surface where it will be evenly illuminated by bright light. The instrument is then preferably held vertically in the left hand at a convenient reading distance from the eyes and the tubes are sighted toward the light reflecting surface. The known or standard solution is poured into one of the test tubes to a height at which the color is of sufficient intensity and definition for matching. The unknown solution is then poured into the other tube a little at a time, sighting carefully after each addition until the color in the two tubes appears to be an exact match. The tubes may then be removed from the block and the contents measured, as for example by direct reading of the levels.

The calculation is the same as for the Du Boscq prism type of instrument, viz:

$$\frac{\text{Reading of the standard}}{\text{Reading of the unknown}} \times \text{Colorimetric factor for the technic employed} = \frac{1}{\text{gravimetric content of the unknown per 100 cc.}}$$

It is most accurate (a) to practice the use of the instrument by matching the standard against itself several times before matching the unknown against the standard, and (b) to employ, as the final determination, the average of a number of readings.

It will be observed that I have provided a very accurate colorimeter for use in blood and similar analyses in which exactness is vital. The device is simple and may be easily and cheaply manufactured from readily available materials. Because of its low cost, it fills the need of the general practitioner of modest means and is also available as a satisfactory substitute for a more expensive instrument in the event of its damage.

I am aware that the device is applicable for use in various other fields in which accurate color comparison of substances is essential. I am also aware that numerous changes in size and shape, as well as of materials may be made without departing from the spirit of my invention. I, therefore, claim my invention broadly as indicated by the appended claims.

What I claim is:

1. A colorimeter for use in conjunction with a conventional source of light and the normal unaided eyesight of an observer, comprising an opaque member having therethrough a matched pair of bores of equal length and diameter, the axes of which bores are spaced, at the top of said member, a distance substantially equal to one-half the interpupillary spacing of the eyes of the observer, and a matched pair of test tubes so received within said bores as to have their entire side wall portions shielded against the entrance of light by said opaque member, said test tubes having translucent bottoms so exposed by said opaque member that contents in said tubes, viewed through the upper ends thereof, will be transilluminated solely by light entering through the lower ends of said bores and the translucent bottoms of said tubes.

2. A colorimeter for use in conjunction with a conventional source of light and the normal unaided eyesight of an observer, comprising an opaque member having therethrough a matched pair of bores of equal length and diameter, the axes of which bores are spaced, at the top of said member, a distance substantially equal to one-half the interpupillary spacing of the eyes of the observer, and a matched pair of test tubes, of less length than said bores, so received therein, with their upper ends substantially flush with the top of said member, as to have their sidewall portions shielded against the entrance of light by said opaque member, said test tubes having translucent bottoms disposed well within said bores, yet so exposed thereby that contents in said tubes, viewed through the upper ends thereof, will be transilluminated solely by pencils of light entering through the lower ends of said bores and the translucent bottoms of said tubes.

3. A colorimeter for use in conjunction with a conventional source of light and the normal unaided eyesight of an observer, comprising an opaque member having therethrough a matched pair of bores of equal length and diameter, the axes of which bores are spaced, at the top of said member, a distance substantially equal to one-half the interpupillary spacing of the eyes of the observer, and a matched pair of test tubes, of less length than said bores, so received therein, with their upper ends substantially flush with the top of said member, as to have their sidewall portions shielded against the entrance of light by said member, said test tubes having translucent hemispherical bottoms disposed well within said bores, yet so exposed thereby that contents in said tubes, viewed through the upper ends thereof, will be transilluminated solely by pencils of light entering through the lower ends of said bores and the translucent bottoms of said tubes.

4. A colorimeter for use in conjunction with a conventional source of light and the normal unaided eyesight of an observer, comprising a member having therethrough a matched pair of bores of equal length and diameter, the axes of which bores are spaced, at the top of said member, a distance substantially equal to one-half the interpupillary spacing of the eyes of the observer, the walls of which bores are opaque and the internal surfaces of which bores are non-reflecting to light, and a matched pair of test tubes so received therein with their upper ends substantially flush with the top of said member, as to have their sidewall portions shielded against the entrance of light by the walls of said bores, said test tubes having translucent bottoms disposed well within said bores, yet so exposed thereby that contents in said tubes, viewed through the upper ends thereof, will be transilluminated solely by pencils of light entering through the lower ends of said bores and the translucent bottoms of said tubes.

5. A colorimeter for use in conjunction with a conventional source of light and the normal unaided eyesight of an observer, comprising an opaque member having therethrough a matched pair of bores of equal length and diameter, the axes of which bores are spaced, at the top of said member, a distance substantially equal to one-half the interpupillary spacing of the eyes of the observer, which bores diverge downwardly at an angle of substantially five degrees, and a matched pair of test tubes so received within said bores as to have their entire sidewall portions shielded against the entrance of light by said opaque member, said test tubes having translucent bottoms so exposed by said opaque member that contents in said tubes, viewed through the upper ends thereof, will be transilluminated solely by light entering through the lower ends of said bores and the translucent bottoms of said tubes.

6. A colorimeter for use in conjunction with a conventional source of light and the normal unaided eyesight of an observer, comprising an opaque member having therethrough a matched pair of bores of equal length and diameter, the axes of which bores are spaced, at the top of said member, a distance substantially equal to one-half the interpupillary spacing of the eyes of the observer, and a matched pair of graduated test tubes so received within said bores as to have their entire sidewall portions shielded against the entrance of light by said opaque member, said test tubes having translucent bottoms so exposed by said opaque member that contents in said tubes, viewed through the upper ends thereof, will be transilluminated solely by light entering through the lower ends of said bores and the translucent bottoms of said tubes.

ARTHUR T. BRICE, Jr.